United States Patent [19]

Fritts et al.

[11] 4,399,005

[45] Aug. 16, 1983

[54] METHOD OF NICKEL ELECTRODE PRODUCTION

[75] Inventors: David H. Fritts, Dayton; John F. Leonard, Xenia, both of Ohio

[73] Assignee: The United States of America as represented by the Secretary of the Air Force, Washington, D.C.

[21] Appl. No.: 333,216

[22] Filed: Dec. 21, 1981

[51] Int. Cl.$^3$ .................... H01M 4/04; C25D 11/00
[52] U.S. Cl. .................................................. 204/2.1
[58] Field of Search ............................ 204/2.1, 56 R

[56] References Cited

U.S. PATENT DOCUMENTS

| | | | |
|---|---|---|---|
| 3,507,699 | 4/1970 | Pell et al. | 136/76 |
| 3,615,830 | 10/1971 | Johnson | 136/6 |
| 3,671,321 | 6/1972 | Herman et al. | 136/75 |
| 3,827,911 | 8/1974 | Pickett | 136/24 |

Primary Examiner—T. M. Tufariello
Attorney, Agent, or Firm—Donald J. Singer; Charles E. Bricker

[57] ABSTRACT

A method for preparing nickel electrodes is provided in which zinc hydroxide is deposited onto a metal plaque simultaneously with nickel hydroxide. A nickel electrode so prepared exhibits improved dimensional stability.

7 Claims, No Drawings

METHOD OF NICKEL ELECTRODE PRODUCTION

RIGHTS OF THE GOVERNMENT

The invention described herein may be manufactured and used by or for the Government of the United States for all governmental purposes without the payment of any royalty.

FIELD OF THE INVENTION

This invention relates to the manufacture of nickel electrodes for use in nickel cadmium batteries.

BACKGROUND OF THE INVENTION

Nickel cadmium batteries are important power sources. Batteries of this type are normally sealed and may be used without complicated routine maintenance. The cells may be recharged many times and they provide a relatively constant output potential during discharge.

The nickel electrodes generally comprise a quantity of nickel hydroxide supported by an expanded metal grid or metal screen or a sintered nickel plague. These electrodes generally comprise one or more additives to enhance their performance, e.g., to provide higher efficiency, greater chemical stability and longer cycle life. Many additives have been investigated in hopes of further enhancing the performance of nickel electrodes.

The most commonly used additive is cobalt, which has been found to enhance cycle life, enhance charging efficiency and inhibit electrode growth. Cobalt, however, is becoming more scarce and higher in cost. Thus, some manufacturers have reduced the level of cobalt in their nickel electrodes.

Nickel electrodes may be manufactured by pressing a powder mixture consisting mainly of nickel hydroxide into an expanded metal grid or onto a metal screen. They may also be manufactured by electrolytically depositing nickel hydroxide from a solution of nickel nitrate onto a porous, sintered nickel plaque. U.S. Pat. No. 3,615,830 discloses that the presence of zinc in a pressed nickel hydroxide electrode produces an improvement in charge retention as well as in charge acceptance at elevated temperatures. This improvement is achieved by adding zinc powder or zinc oxide to a mass of dry powders consisting of nickel hydroxide and other powders. After mixing, the powder mixture is pressed into an expanded metal grid to form the pressed powder electrode.

Although U.S. Pat. No. 3,615,830 discloses an improvement in pressed powder nickel electrodes by incorporating zinc therein, the patent does not reveal how zinc might be incorporated into a nickel electrode of the deposited nickel hydroxide type. It is believed that the advantages of incorporating zinc into a pressed powder electrode would not be seen in an electrode of the electrolytically deposited type, because much or most of the zinc or zinc oxide originally present in a porous nickel plaque would be covered over by nickel hydroxide during the electrolytic deposition step.

It is therefore an object of the present invention to provide a process for incorporating zinc into an electrode of the deposited nickel hydroxide type.

It is another object of the present invention to provide an improved electrode of the deposited nickel hydroxide type.

Other objects and advantages of the present invention will be apparent to those skilled in the art upon consideration of the following disclosure.

SUMMARY OF THE INVENTION

In accordance with the present invention, there is provided an improved process for making a nickel electrode. This process comprises the steps of immersing a porous, electrically conductive plaque in a nickel nitrate electrolyte bath, forming the plaque at a desired current density, continuously adding a zinc nitrate solution to the electrolyte bath at a controlled rate and continuing the forming and addition steps until the metal nitrate in the plaque pores in converted to a desired level of the corresponding metal hydroxide.

Also provided is a novel nickel electrode which initially comprises a porous, electrically conductive plaque having deposited thereon an active material consisting essentially of a major amount of nickel hydroxide and a minor amount of zinc hydroxide.

DETAILED DESCRIPTION OF THE INVENTION

The porous nickel plaques used in the practice of the process of this invention are of the type conventionally used in preparing nickel electrodes. In one method of producing such porous nickel plaques, a layer of nickel carbonyl powder is placed on each side of a nickel screen. The composite material is placed in a graphite mold and sintered in a non-oxidizing atmosphere at an elevated temperature and pressure. The porosity of the sintered plaque generally ranges from 70 to 90 percent, with a porosity in the range of 73 to 83 being preferred.

In the solution bath, each porous nickel plaque is positioned between two nickel sheets. Thus, when a plurality of electrodes are fabricated, the number of nickel sheets is greater by one than the number of porous nickel plaques. The nickel sheets serve as anodes and are connected in parallel. The plaques, which are being made cathodic, are likewise connected in parallel. The dimensions of each of the plaques and of each of the sheets are generally the same, or at least they have substantially the same surface area. The plaques are generally separated from the sheets by a space of 0.5 to 1.0 inch.

In conducting the process of this invention, the electrolyte bath is maintained at a temperature of about 70° to 90° C., preferably about 75° to 85° C.

The electrolyte bath is an aqueous solution of nickel nitrate. The amount of nickel nitrate in solution can be conveniently expressed in terms of nickel per liter of solution. Thus, the amount of nickel nitrate is such that there are about 75 to 150 grams of nickel per liter of solution.

The pH of the electrolyte bath is maintained on the acid side. Although a buffer may be employed, it is preferred that the pH be maintained in the range of about 2–4, preferably 3.5±0.2 by the addition of nitric acid to the electrolyte as required.

The amount of zinc nitrate in solution may be conveniently expressed in terms of zinc per liter of solution. The amount of zinc nitrate is such that there are about 3 to 10 grams of zinc per liter of solution.

In carrying out the process of this invention, the electrolyte bath is brought to its desired temperature. The porous nickel plaque or plaques and the required number of nickel counter-electrode sheets, spaced apart from one another, are then immersed in the bath. After connecting the plaque or plaques to a negative source of direct current and the counter-electrodes to the positive source, current is passed through the circuit. Current is passed through the electrolyte at a current density in the approximate range of 0.2 to 0.6, preferably about 0.25 to 0.45, ampere per square inch of surface area of the plaque or plaques. The electrolyte is agitated to achieve uniform pH, temperature and composition throughout the bulk of the solution.

The zinc nitrate solution is added to the electrolyte bath at a desired rate. The rate of addition is dependent upon such factors as the amount of zinc desired in the finished electrode, the concentration of zinc in the zinc nitrate solution, the quantity of nickel hydroxide desired in the finished electrode, the total time of deposit of nickel and zinc in the porous plaque, and the like. The zinc nitrate solution may be added to the electrolyte bath in dropwise manner; however, it is preferred to add the zinc nitrate solution continuously, using, for example, a metering pump. The zinc nitrate solution may also be premixed with a separate nickel nitrate solution and the resulting mixture may then be mixed into the electrolyte bath.

The zinc nitrate solution is added to the electrolyte bath in an amount sufficient to provide about 2 to 10 weight percent, preferably about 3 to 7 weight percent, zinc in the finished electrode, based upon the weight of active material, i.e., nickel hydroxide and zinc hydroxide, in the electrode.

It is also desirable to initiate the electrolytic deposition in an electrolyte bath containing about 2 to 10 ppm of zinc.

Current is passed through the electrolyte bath for a time sufficient to deposit the desired amounts of nickel hydroxide and zinc hydroxide in the pores of the plaque or plaques. In general, such deposit will require about 1 to 3 hours. The amount of nickel hydroxide that precipitates or is deposited in the pores generally ranges from about 1.5 to 2.0 grams per cubic centimeter of plaque pore volume.

Subsequently, the plaques are conditioned against nickel counter-electrodes in a 31 percent KOH bath by subjecting the plaques to 1 to 5 charge/discharge cycles, each cycle being about 20 minutes of charge and about 20 minutes of discharge at 0.5 ampere per square inch.

At the completion of the conditioning step, the plaques are washed as described above. Thereafter, the washed plaques are dried, preferably in a vacuum oven at a temperature of about 50° C.

The following examples illustrate the invention.

EXAMPLE I

A series of test electrodes were made by aqueous electrochemical impregnation of commercial sintered nickel plaques. The plaques had a nominal thickness of 0.8 mm and a porosity of 78 percent. The impregnation was carried out using a beaker as the impregnation vessel. The plaques were connected to a negative source of direct current and immersed in the electrolyte bath between nickel counter-electrodes, the latter being connected to the positive source of direct current. The electrode bath was an aqueous solution of 2M nickel nitrate. The impregnation was done at 80° C. The pH of the electrolyte solution was maintained at 3.5±0.2 by periodic addition of nitric acid. The electrode bath was continuously stirred using a magnetic stirrer.

A current of 0.35 ampere per square inch of geometric area of the plaque was passed through the circuit. 0.1 M zinc nitrate solution was added continuously to the stirred electrolyte bath at a rate consistent with the desired zinc content in the finished electrode. The time of passage of current was about 2 hours.

At the end of the impregnation period, the plaques were removed from the solution and rinsed in pure water to remove residual impregnating solution. The plaques were formed for three cycles in a 31 percent (by weight) aqueous KOH solution against nickel counter-electrodes at 0.5 ampere per square inch. The formed plaques were rinsed in pure water, then dried. Test samples were cut from the formed plaques with dimensions 12.7 mm wide by 90 mm long. These samples were used for zinc determination by atomic absorption spectrophotometry and for in situ measurement of electrode growth in a nickel cadmium cell. The nickel cadmium cell used in these tests was equipped with a Linear Voltage Displacement Transducer to measure electrode growth. This special cell is fully described in the Journal of Power Sources, Volume 6, pp 171–184 (1981).

The samples were presorted according to hardness to minimize the influence of hardness (H) on electrode growth. Hardness was measured by pressing 12.7 mm diameter steel ball into the sample using a 100 g tare load followed by a 400 g test load. Hardness (H) is defined as the inverse of the depth of indentation (in millimeters).

The cycling conditions for the sample electrodes were 25 percent overcharge (assuming a one electron exchange) to 100 percent discharge point was taken to be 0.3 volts for the nickel-cadmium test cell. The cells were nickel limited. A cadmium strip third electrode was used for monitoring the cell to assure that it was nickel limited for all cycles.

The results of these tests are given in Table I below. In the table, loading refers to the weight of active material, i.e., nickel hydroxide and zinc hydroxide per cc of void. The total strain is the total cimulative strain for the total cycles put on each sample. The maximum utilization efficiency is given together with the cycle number at which it occurred.

TABLE I

| $Zn(NO_3)_2$soln. added ml/in$^2$c | Loading | % Zn | Hardness | Total Strain | $\eta$ % (cycle no.) |
|---|---|---|---|---|---|
| 0 | 1.29 | 0 | 25.1 | $2.9 \times 10^{-3}$ | 101(10) |
| 12.2 | 1.25 | 3.3 | 22.4 | $2.9 \times 10^{-3}$ | 108(16) |
| 20.2 | 1.16 | 4.8 | 24.6 | $5.9 \times 10^{-3}$ | 103(16) |
| 28.2 | 1.10 | 7.0 | 23.3 | $1.1 \times 10^{-3}$ | 97(57) |

In general, the above data indicate that reduced electrode strain does not become apparent until a 7 percent zinc concentration is used. The erratic results at the lower concentrations are thought to be due to poor distribution of the zinc in the electrodes.

EXAMPLE II

The procedures given in Example I were followed except that the impregnation was carried out in a vessel having a premix chamber and an impregnation chamber, with a perforated divider between the two chambers. Both chambers were equipped with magnetic stirrers. The test results are given in Table II below.

TABLE II

| Loading | % Zn | Hardness | Total Strain | η % (cycle no.) |
|---|---|---|---|---|
| 1.29 | 0 | 25.1 | $2.9 \times 10^{-3}$ | 101(10) |
| 1.34 | 2 | 20.9 | $5.8 \times 10^{-4}$ | 75(44) |
| 1.28 | 4.5 | 20.6 | $2.7 \times 10^{-4}$ | 92(134) |
| 1.36 | 6.0 | 22.1 | $2.5 \times 10^{-4}$ | 62(26) |

These data illustrate that the better mixing afforded by premixing the zinc nitrate with the nickel nitrate provides improved electrodes at lower concentrations of zinc. The domensional stability of these electrodes, as indicated by the total strain is extremely good.

Various modifications of the present invention may be made by those skilled in the art upon consideration of the foregoing disclosure without departing from the spirit or scope of the invention.

We claim:

1. A process for making a nickel electrode which comprises the steps of:
   (a) immersing a porous, electrically conductive plaque in an electrolyte bath provided with a counter-electrode, said bath comprising an aqueous solution of nickel nitrate;
   (b) forming the conductive plaque against the said counter-electrode at a desired current density;
   (c) continuously adding, at a desired rate, an aqueous solution of zinc nitrate to said electrolyte bath; and
   (d) continuing said forming step (b) and said addition step (c) for a time sufficient to convert the metal nitrates in the pores of said plaque to a desired level of the corresponding metal hydroxides.

2. The process of claim 1 wherein said electrolyte bath comprises about 75 to about 150 grams of nickel per liter of solution.

3. The process of claim 2 wherein said electrolyte bath initially comprises from about 2 to about 10 ppm of zinc nitrate.

4. The process of claim 1 wherein said electrolyte bath is adjusted during said forming to maintain the pH in the range of 2 to 4.

5. The process of claim 1 wherein said electrolyte bath is adjusted during said forming to maintain the pH in the range of 3.3 to 3.7.

6. The process of claim 1 wherein said current density is in the approximate range of 0.2 to 0.6 ampere per square inch.

7. The process of claim 1 wherein said electrolyte bath is maintained at a temperature in the approximate range of 70° to 100° C.

* * * * *